United States Patent
Hara et al.

(10) Patent No.: US 11,904,678 B2
(45) Date of Patent: Feb. 20, 2024

(54) ELECTRIC VEHICLE COOLING SYSTEM

(71) Applicant: TOYOTA JIDOSHA KABUSHIKI KAISHA, Toyota (JP)

(72) Inventors: Yasuhiro Hara, Nagoya (JP);
Norimasa Koreishi, Miyoshi (JP);
Jumpei Watanabe, Nagakute (JP);
Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/840,766

(22) Filed: Jun. 15, 2022

(65) Prior Publication Data

US 2022/0402350 A1 Dec. 22, 2022

(30) Foreign Application Priority Data

Jun. 22, 2021 (JP) ................................. 2021-103521

(51) Int. Cl.
*B60K 11/04* (2006.01)
(52) U.S. Cl.
CPC ................................... *B60K 11/04* (2013.01)
(58) Field of Classification Search
CPC .......... B60K 11/04; B60K 11/02; B60K 1/00; B60K 2001/003; B60K 2001/005; B60K 2001/006; F10P 3/12; F10P 3/18; F10P 7/14; F10P 2003/182; F10P 2007/146

See application file for complete search history.

(56) References Cited

U.S. PATENT DOCUMENTS

| | | | |
|---|---|---|---|
| 9,895,954 B2 * | 2/2018 | Chen | F16B 5/04 |
| 2011/0114402 A1 | 5/2011 | Inoue et al. | |
| 2012/0168125 A1 * | 7/2012 | Johnston | F28D 1/0443 165/96 |
| 2017/0361700 A1 * | 12/2017 | Borud | B62D 55/00 |
| 2020/0018222 A1 | 1/2020 | Tholander et al. | |
| 2021/0086589 A1 * | 3/2021 | Shao | G05D 1/021 |
| 2022/0001717 A1 * | 1/2022 | Kim | B60K 11/02 |

FOREIGN PATENT DOCUMENTS

| | | |
|---|---|---|
| JP | 2010-018057 A | 1/2010 |
| JP | 2016-147559 A | 8/2016 |
| JP | 2018-131023 A | 8/2018 |

* cited by examiner

*Primary Examiner* — Grant Moubry
(74) *Attorney, Agent, or Firm* — Dinsmore & Shohl LLP

(57) ABSTRACT

An electric vehicle cooling system, including: a first radiator installed at a vehicle and configured to cool a power unit driven by electrical power; and a second radiator installed at the vehicle, disposed at least at one side in a vehicle width direction, or another side in the vehicle width direction, of the first radiator so as not to overlap with the first radiator as viewed along a vehicle front-rear direction, and configured to cool an autonomous driving control device configured to control autonomous driving of the vehicle.

4 Claims, 9 Drawing Sheets

ELECTRIC VEHICLE COOLING SYSTEM

CROSS-REFERENCE TO RELATED APPLICATION

This application is based on and claims priority under 35 USC 119 from Japanese Patent Application No. 2021-103521 filed on Jun. 22, 2021, the disclosure of which is incorporated by reference herein.

BACKGROUND

Technical Field

The present disclosure relates to an electric vehicle cooling system.

Related Art

A disclosure related to a hybrid vehicle is disclosed in Japanese Patent Application Laid-Open (JP-A) No. 2010-18057. This hybrid vehicle includes an engine radiator and a hybrid radiator. This accordingly enables an engine to be cooled with the engine radiator, and an inverter unit and a motor to be cooled with the hybrid radiator.

However, the engine radiator is not needed in cases in which the above related technology is applied to an electric vehicle since there is no engine installed in the electric vehicle. However, the engine radiator and the hybrid radiator in the above related technology are the same from the perspective of cooling a power unit of a vehicle, and there is a need to separately provide a radiator for cooling an autonomous driving control device in cases in which the above related technology is applied to an autonomous driving vehicle.

However, there is no reference in JP-A No. 2010-18057 to cooling an autonomous driving control device. Moreover, the engine radiator and the hybrid radiator are arranged in JP-A No. 2010-18057 so as to overlap when viewed along the vehicle front-rear direction, and so securing effective cooling of each radiator would be difficult even were the above related technology to be applied to an electric vehicle capable of autonomous driving. This means that there is room for improvement in the above related technology from the perspective of securing effective cooling of the power unit and the autonomous driving control device in an electric vehicle capable of autonomous driving.

SUMMARY

The present disclosure obtains, for an electric vehicle capable of autonomous driving, an electric vehicle cooling system that enables cooling efficiency for a power unit and an autonomous driving control device to be secured.

An electric vehicle cooling system according to a first aspect of the present disclosure includes a first radiator installed at a vehicle and configured to cool a power unit driven by electrical power, and a second radiator installed at the vehicle, disposed at least at one side in a vehicle width direction, or another side in the vehicle width direction, of the first radiator so as not to overlap with the first radiator as viewed along a vehicle front-rear direction, and configured to cool an autonomous driving control device configured to control autonomous driving of the vehicle.

According to the first aspect of the present disclosure, the first radiator is installed at the vehicle, and the power unit of the vehicle can be cooled by the first radiator even in cases in which the power unit is heated up by the power unit being driven by electrical power.

Moreover, in the present disclosure the second radiator is installed at the vehicle, enabling the autonomous driving control device heated up by operation to be cooled by the second radiator.

However, were the first radiator and the second radiator to be arranged so as to overlap when viewed along the vehicle front-rear direction, then hot airflow flowing from one side out of the first radiator or the second radiator would flow to the other side out of the first radiator or the second radiator, making it difficult to secure cooling efficiency thereof.

Thus in the present disclosure the second radiator is arranged at least at one out of one side in the vehicle width direction or the other side in the vehicle width direction of the first radiator so as not to overlap with the first radiator when viewed along the vehicle front-rear direction. This means that hot airflow flowing from one side out of the first radiator or the second radiator can be suppressed from flowing to the other side out of the first radiator or the second radiator.

An electric vehicle cooling system according to a second aspect of the present disclosure is the first aspect includes a pair of the second radiators disposed at an interval from each other in the vehicle width direction.

The second aspect of the present disclosure enables one of the second radiators to be operated alone in cases in which the operating temperature of the autonomous driving control device is low and the required heat dissipation amount is small, and enables both the second radiators to be operated in cases in which the operating temperature of the autonomous driving control device is high and the required heat dissipation amount is large.

An electric vehicle cooling system according to a third aspect of the present disclosure is the second aspect further including a first outflow pipe and a first inflow pipe, a second outflow pipe and a second inflow pipe, and a flow path switching section. The first outflow pipe configured to allow cooling water cooled by one of the pair of second radiators to flow out to a side of the autonomous driving control device, and the first inflow pipe configured to allow the cooling water, which has flowed from the side of the autonomous driving control device, to flow into the one of the pair of second radiators, both of the first outflow pipe and the first inflow pipe being connected to the one of the pair of second radiators. The second outflow pipe configured to allow the cooling water cooled by the other of the pair of second radiators to flow out to the side of the autonomous driving control device, and the second inflow pipe configured to allow the cooling water, which has flowed from the side of the autonomous driving control device, to flow into the other of the pair of second radiators, both of the second outflow pipe and the second inflow pipe being connected to the other of the pair of second radiators. In a state in which a first heat exchange is permitted between the one of the pair of second radiators and the autonomous driving control device and a second heat exchange is permitted between the other of the pair of second radiators and the autonomous driving control device, the flow path switching section being configured to permit a first connection between the first outflow pipe and the second outflow pipe and to permit a second connection between the first inflow pipe and the second inflow pipe. In a state in which one of the first heat exchange or the second heat exchange is prevented, the flow path switching section is configured to prevent the first connection and the second connection and to prevent inflow and outflow of the cooling water to and from a side of the second radiator configuring the prevented heat exchange.

In the third aspect of the present disclosure, the first outflow pipe and the first inflow pipe are also connected to the one of the pair of second radiators. The cooling water cooled by the one of the pair of second radiators outflows to the side of the autonomous driving control device through the first outflow pipe, enabling the autonomous driving control device to be cooled with this cooling water. The cooling water that has flowed in from the side of the autonomous driving control device through the first inflow pipe inflows to the one of the pair of second radiators, and this cooling water is cooled by the one of the pair of second radiators.

The second outflow pipe and the second inflow pipe are also connected to the other of the pair of second radiators. The cooling water cooled by the other of the pair of second radiators outflows to the side of the autonomous driving control device through the second outflow pipe, enabling the autonomous driving control device to be cooled with this cooling water. The cooling water that has flowed in from the side of the autonomous driving control device through the second inflow pipe inflows to the other of the pair of second radiators, and this cooling water is cooled by the other of the pair of second radiators.

Were a malfunction however to occur in the one of the pair of second radiators or the other of the pair of second radiators while the vehicle is traveling, then this might conceivably result in trouble with autonomous driving of the vehicle. In some embodiments, while the vehicle is evacuating to a safety zone the autonomous driving control device can be cooled by the radiator not malfunctioning from out of the one of the pair of second radiators or the other of the pair of second radiators.

The present disclosure is equipped with the flow path switching section, enabling the cooling water flow path to be changed according to the state of the pair of second radiators.

More specifically, in a state in which the first heat exchange is permitted between the one of the pair of second radiators and the autonomous driving control device and the second heat exchange is permitted between the other of the pair of second radiators and the autonomous driving control device, the flow path switching section permits the first connection between the first outflow pipe and the second outflow pipe and permits the second connection between the first inflow pipe and the second inflow pipe.

Namely, the present disclosure is configured such that in a state in which the pair of second radiators are running correctly, the cooling water outflowing from the first outflow pipe and the second outflow pipe merges and flows into the side of the autonomous driving control device. Moreover, the cooling water outflowing from the side of the autonomous driving control device splits and flows respectively to the side of the one of the pair of second radiators and the side of the other of the pair of second radiators.

In a state in which one of the first heat exchange or the second heat exchange is prevented, the flow path switching section is configured to prevent the first connection and the second connection and to prevent inflow and outflow of the cooling water to and from a side of the second radiator configuring the prevented heat exchange.

Namely, in the present disclosure in an abnormal state in which one of the pair of second radiators from out of the pair of second radiators is not functioning, the one of the pair of second radiators is isolated from the flow path of the cooling water flow path. This enables a state to be achieved in which a certain degree of cooling performance is secured for the autonomous driving control device by the other functioning second radiator from out of the pair of second radiators.

An electric vehicle cooling system according to a fourth aspect of the present disclosure is one of the first aspect to the third aspect, further including a support section, an upper extension portion, and a lower extension portion. The support section extends in a vehicle height direction and is supported by an outer side portion, in a vehicle width direction, of a frame of the vehicle. The upper extension portion extends from a vehicle upper side portion of the support section toward a vehicle front-rear direction center and a vehicle width direction outer side, and supports a vehicle upper side portion of the second radiator. The lower extension portion extends from a vehicle lower side portion of the support section toward the vehicle front-rear direction center and the vehicle width direction outer side, and supports a vehicle lower side portion of the second radiator.

In the fourth aspect of the present disclosure the support section extending in the vehicle height direction is supported by the outer side portion, in the vehicle width direction, of the vehicle frame. The upper extension portion extends from the vehicle upper side portion of the support section toward the vehicle front-rear direction center and vehicle width direction outer side, and the vehicle upper side portion of the second radiator is supported by the upper extension portion.

The lower extension portion extends from the vehicle lower side portion of the support section toward the vehicle front-rear direction center and the vehicle width direction outer side, and the vehicle lower side portion of the second radiator is supported by the lower extension portion.

The present disclosure thereby enables the second radiator to be arranged in an angled state with respect to the vehicle front-rear direction as viewed along the vehicle height direction.

As described above, the electric vehicle cooling system according to the first aspect of the present disclosure exhibits the effect in an electric vehicle capable of autonomous driving of enabling effective cooling for the power unit and the autonomous driving control device to be secured.

The electric vehicle cooling system according to the second aspect of the present disclosure exhibits the effect of being able to secure appropriate radiator cooling performance according to the operating temperature of the autonomous driving control device and the required heat dissipation amount.

The electric vehicle cooling system according to the third aspect of the present disclosure exhibits the effect of being able to achieve a state in which a certain degree of traveling performance of the vehicle is secured even in an abnormal state in which sufficient cooling performance is unable to be secured for the autonomous driving control device.

The electric vehicle cooling system according to the fourth aspect of the present disclosure exhibits the effect of being able to disposed the radiator so as to follow a styling face of the vehicle.

BRIEF DESCRIPTION OF THE DRAWINGS

Exemplary embodiments of the present disclosure will be described in detail based on the following figures, wherein.

DETAILED DESCRIPTION

Figure 1:
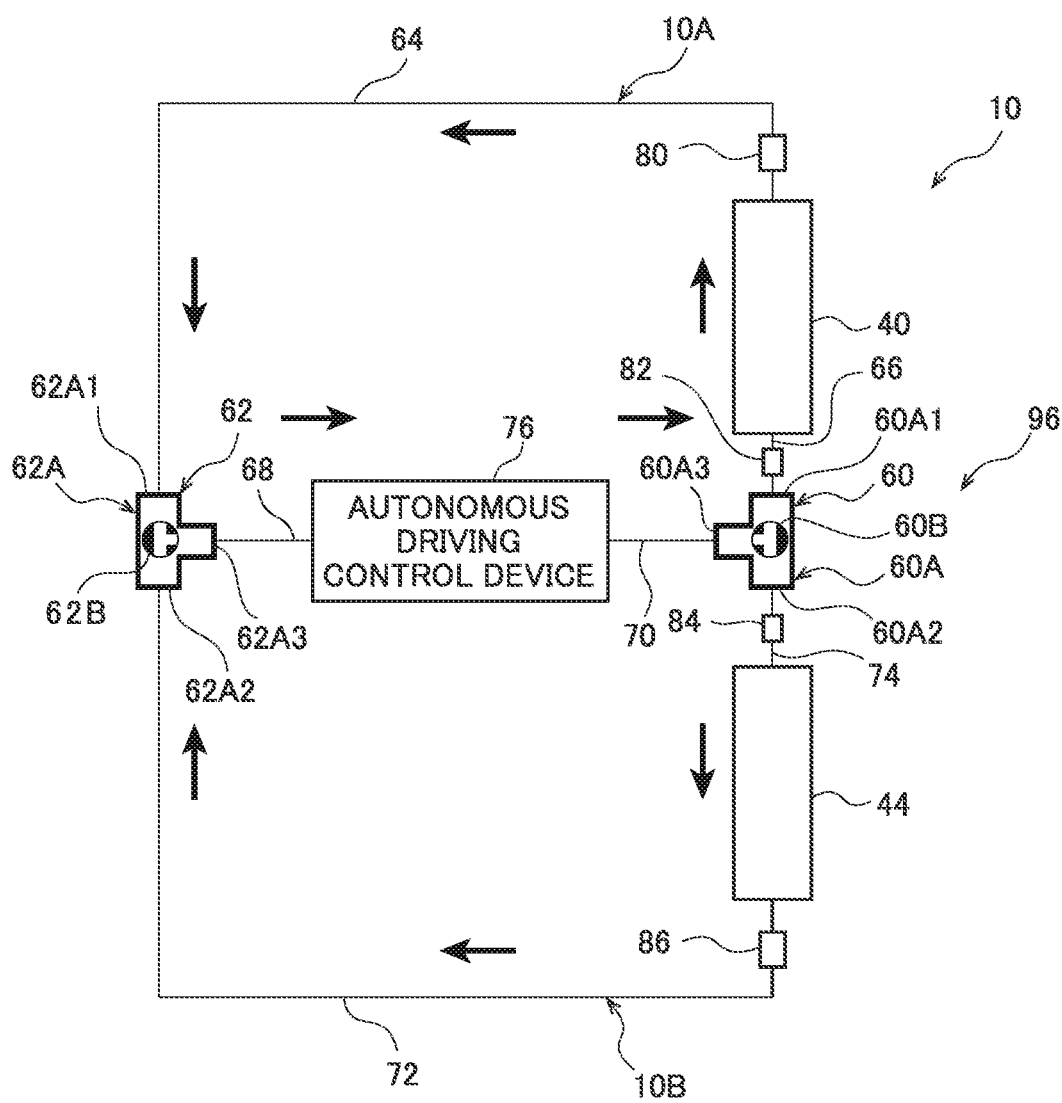
FIG. 1 is a circuit diagram schematically illustrating a normal state of an electric vehicle cooling system according to an exemplary embodiment.

Explanation follows regarding an example of an exemplary embodiment of an electric vehicle cooling system according to the present disclosure, with reference to FIG. 1 to FIG. 9. Note that where appropriate in the drawings an arrow FR indicates a vehicle front side of a "vehicle 12" serving as an electric vehicle installed with an "electric vehicle cooling system 10" according to the present exemplary embodiment (hereafter referred to as "the cooling system 10"), an arrow UP indicates a vehicle upper side, and an arrow RH indicates a vehicle width direction right side.

Figure 9:
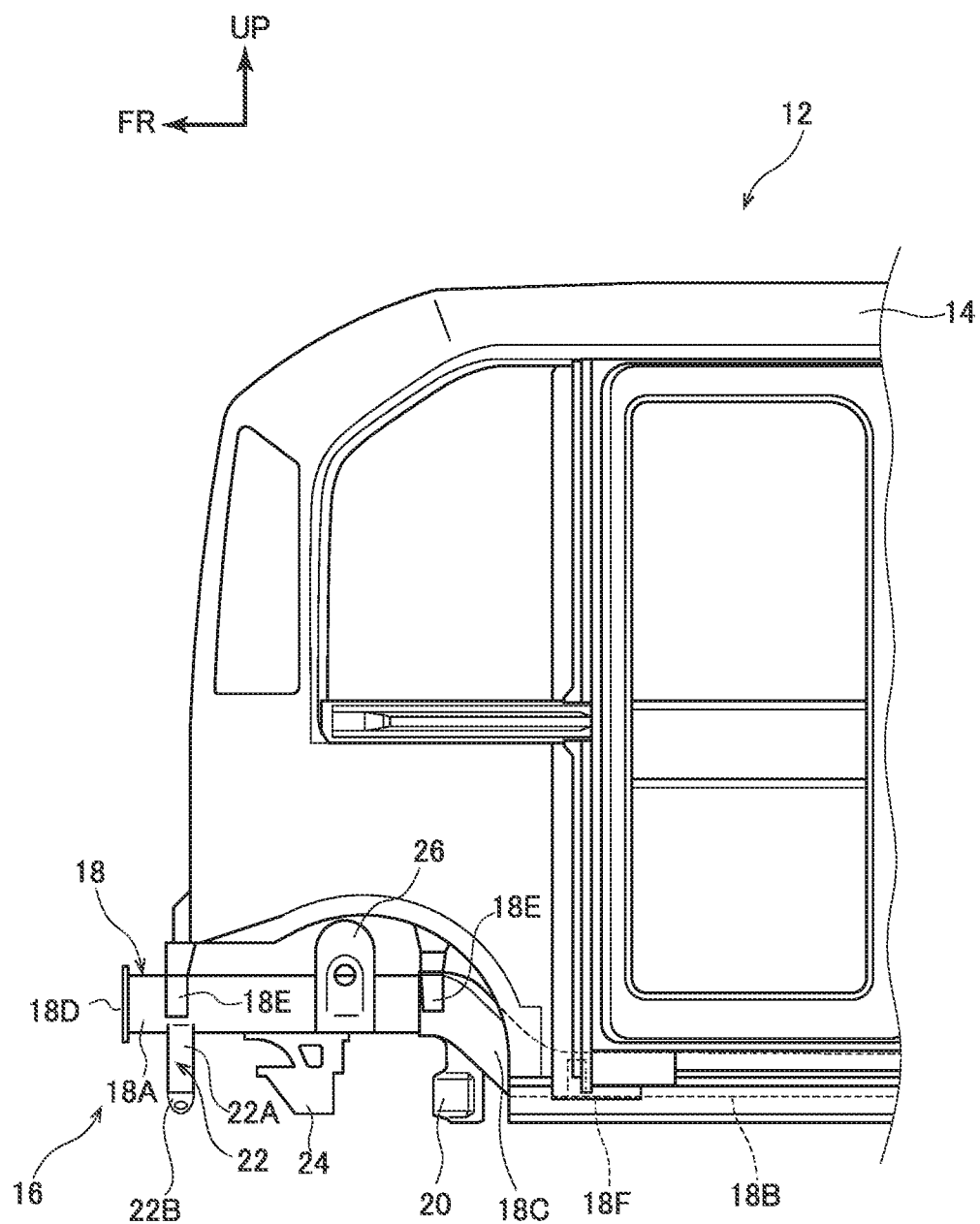
FIG. 9 is a side view schematically illustrating a configuration of a vehicle installed with an electric vehicle cooling system according to an exemplary embodiment.

As illustrated in FIG. 9, the vehicle 12 has a so-called frame structure, including a steel vehicle body 14, and a steel "frame 16" supporting the vehicle body 14.

Figure 8:
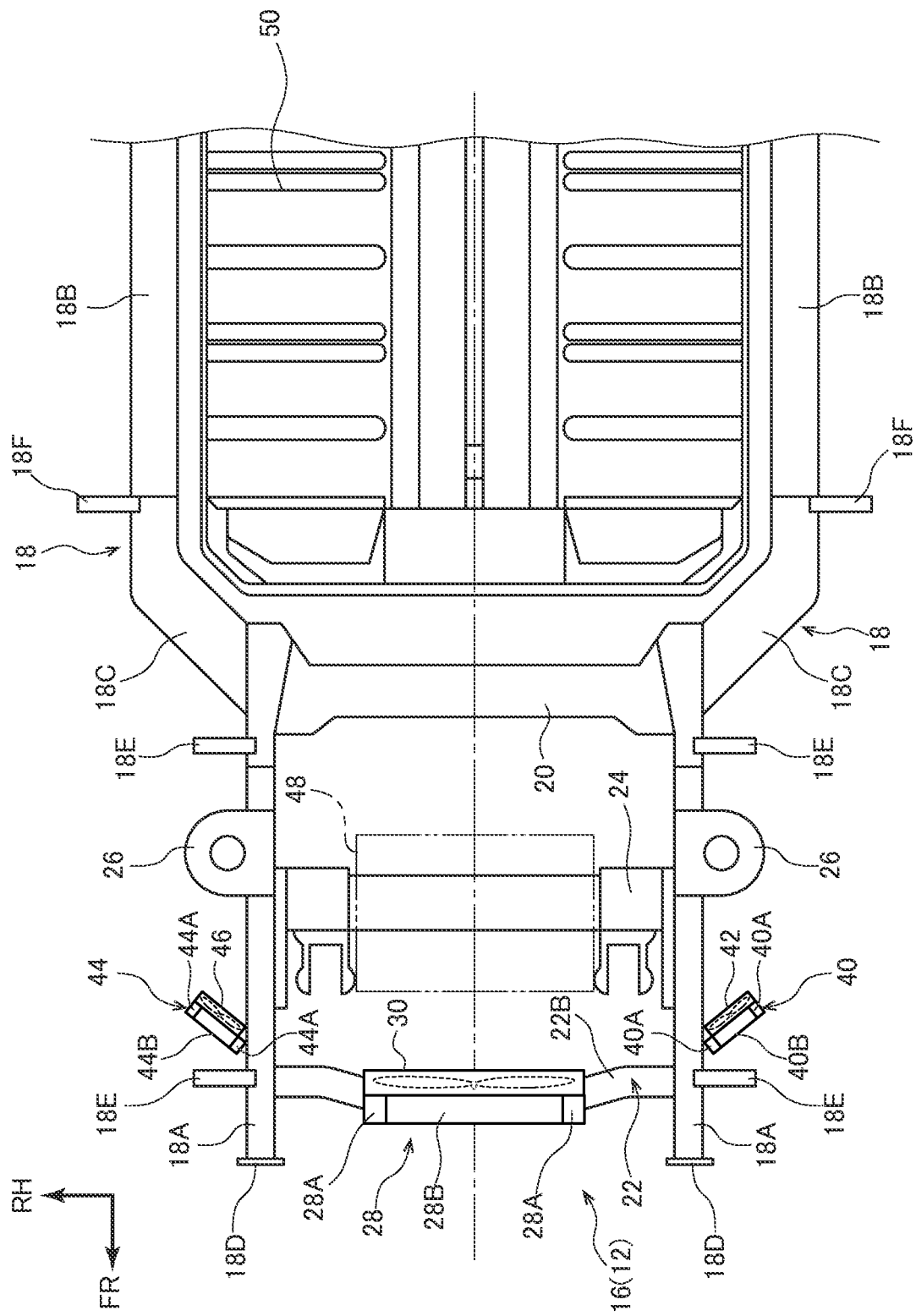
FIG. 8 is a plan view as viewed from a vehicle upper side and schematically illustrating an attached state to a frame of a first radiator and second radiators of an electric vehicle cooling system according to an exemplary embodiment.

As illustrated in FIG. 8, the frame 16 includes a pair of side frames 18 disposed separated from each other in a vehicle width direction, plural cross members 20 spanning between the side frames 18, a radiator mount 22, and a power unit mount 24. Note that the frame 16 has a configuration that is basically symmetrical in the vehicle front-rear direction and the vehicle width direction, and where appropriate this will be taken into consideration to simplify the following explanation of the configuration of the frame 16.

The side frames 18 extend overall in the vehicle front-rear direction and are each configured including a front frame section 18A, a main frame section 18B, and a kicker section 18C. The side frames 18 have a closed cross-section structure with closed cross-sections in sections viewed along the vehicle front-rear direction.

More precisely, the front frame section 18A configures a vehicle front side section of the side frame 18 and extends in a straight line along the vehicle front-rear direction. An attachment plate 18D is provided at a vehicle front side end of each of the front frame sections 18A, and non-illustrated front bumper reinforcement is attached to the attachment plates 18D.

A pair of mounting sections 18E for supporting a vehicle front side section of the vehicle body 14 are provided on each of the front frame sections 18A so as to be separated from each other in the vehicle front-rear direction. A suspension tower 26 is provided between the mounting sections 18E.

The main frame section 18B configures a vehicle front-rear direction central section of the side frame 18, is disposed at the vehicle width direction outer side and vehicle lower side of the front frame section 18A, and extends in a straight line along the vehicle front-rear direction. Plural mounting portions 18F for supporting a vehicle front-rear direction central section of the vehicle body 14 are provided to each of the main frame sections 18B so as to be separated from each other in the vehicle front-rear direction.

The kicker section 18C is interposed between the front frame section 18A and the main frame section 18B. The kicker section 18C extends from the front frame section 18A toward the vehicle rear side and toward the vehicle width direction outer side when viewed along the vehicle height direction, and extends from the front frame section 18A toward the vehicle rear side and the vehicle lower side when viewed along the vehicle width direction.

The radiator mount 22 is configured including fixings 22A and a radiator support section 22B. A pair of the fixings 22A are provided to the pair of respective side frames 18. The fixings 22A are joined at non-illustrated joints to a vehicle lower side of the side frames 18 by welding or the like.

The radiator support section 22B is configured by U-shaped channel-section steel extending along the vehicle width direction and having a cross-section open toward the vehicle lower side when viewed along the vehicle width direction. The ends of the radiator support section 22B are joined at non-illustrated joints to a vehicle lower side of the fixings 22A by welding or the like.

A pair of non-illustrated insertion sections are provided in the radiator support section 22B so as to pass through in the vehicle height direction and be separated from each other in the vehicle width direction. A "center radiator 28" serving as a first radiator configuring part of the cooling system 10 and employed to cool the power unit 48 is attached to the radiator support section 22B using these insertion sections.

More specifically, the center radiator 28 is configured including a pair of tanks 28A capable of storing cooling water and respectively disposed at one side and another side of the center radiator 28 in the vehicle width direction, and a core section 28B disposed between the tanks 28A and employed to cool the cooling water.

Moreover, a circular cylinder shaped non-illustrated projection provided with a female screw portion is provided to a vehicle lower end of each of the tanks 28A so as to project out from the end toward the vehicle lower side. A non-illustrated rubber bush is attached to the projection, and a fastening member is fastened to the projection in a state in which a portion of the rubber bush has been inserted into an insertion section of the radiator support section 22B, thereby fixing the center radiator 28 to the radiator support section 22B.

A cooling fan 30 configuring part of the cooling system 10 is attached to a vehicle rear section of the tanks 28A using a non-illustrated attachment member. The core section 28B of the center radiator 28 is accordingly cooled by the cooling fan 30.

A "side radiator 40" serving as a second radiator is attached to the vehicle width direction left side frame 18 through a side radiator support section 32, and a "side radiator 44" serving as a second radiator is attached to the vehicle width direction right side frame 18 through a side radiator support section 32. Note that the side radiator 40 and the side radiator 44 are employed to cool an "autonomous driving control device 76", described later.

The side radiator 40 and the side radiator 44 each have a similar configuration and are similarly attached to the side frames 18. The following explanation will focus on the side radiator 40 and peripheral configuration thereto, and explanation will be omitted regarding the side radiator 44 and peripheral configuration thereto.

Figure 7:
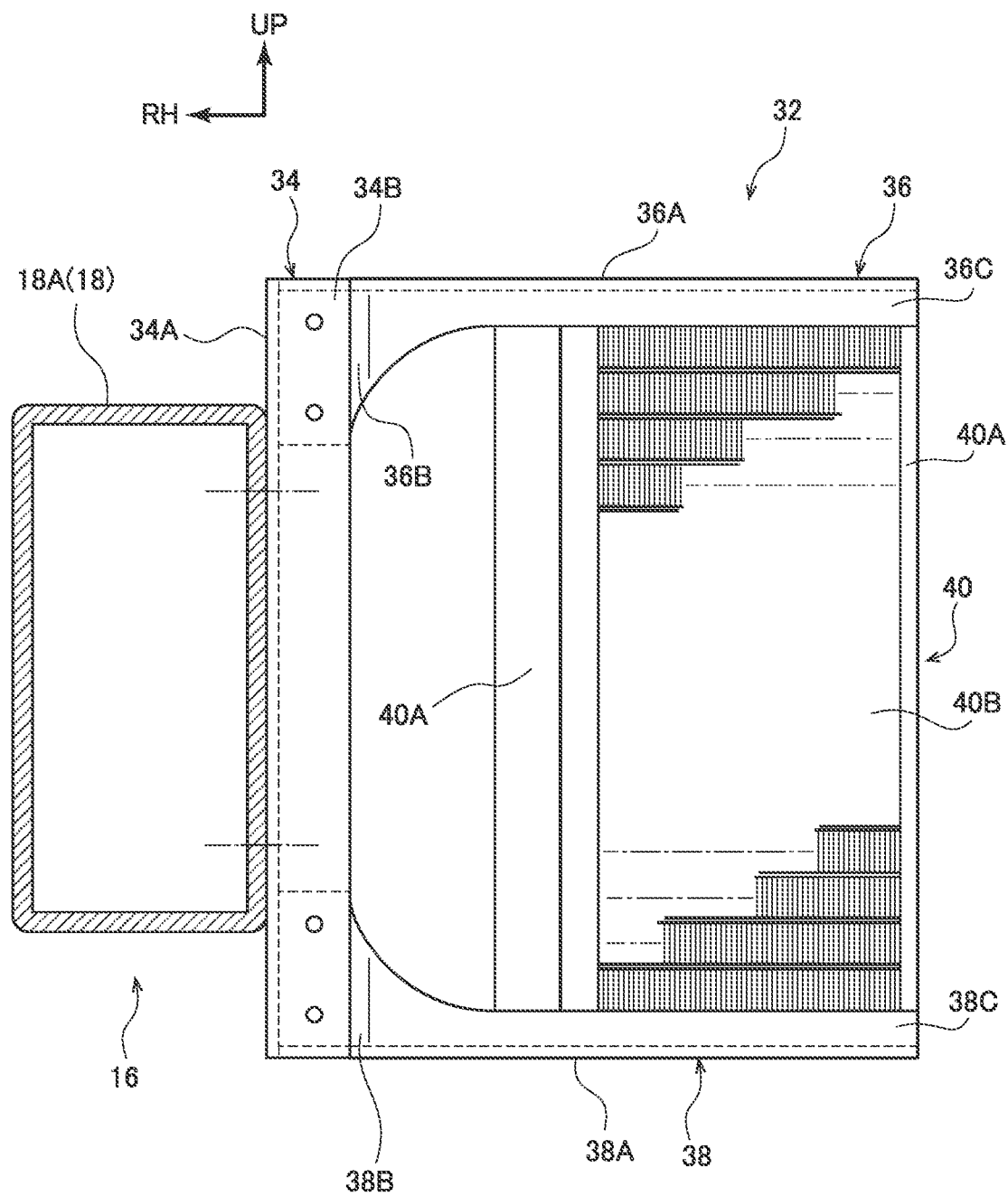
FIG. 7 is a front-on view as viewed from a vehicle front side and illustrating an attached state to a frame of a second radiator of an electric vehicle cooling system according to an exemplary embodiment.

As illustrated in FIG. 7, the side radiator 40 is configured basically the same as the center radiator 28, and includes a pair of tanks 40A disposed at one side and another side of the side radiator 40 in the vehicle width direction, and a core section 40B disposed between the tanks 40A.

A cooling fan 42 configuring part of the cooling system 10 is attached through a non-illustrated attachment member to a vehicle rear section of the tank 40A. This results in a configuration in which the core section 40B of the side radiator 40 is cooled by the cooling fan 42.

The side radiator 44 is configured basically the same as the side radiator 40 and includes a pair of tanks 44A and a core section 44B. A cooling fan 46 configuring part of the cooling system 10 is attached through a non-illustrated attachment member to a vehicle rear section of the tank 44A. This results in a configuration in which the core section 44B of the side radiator 44 is cooled by the cooling fan 46.

The side radiator support sections 32 are each configured including a "base member 34" serving as a support section, an "upper stay 36" serving as an upper extension portion, and a "lower stay 38" serving as a lower extension portion. More specifically, the base member 34 extends in the vehicle height direction and is configured from angle steel, including a side wall 34A configuring a vehicle width direction inner side portion thereof and having a plate thickness direction along the vehicle width direction, and a front wall 34B configuring a vehicle front side portion thereof and having a plate thickness direction along the vehicle front-rear direction.

The base member 34 is arranged between one of the mounting sections 18E and the suspension tower 26, and is supported with respect to the frame 16 by the side wall 34A being attached to a vehicle width direction outer side portion of the front frame section 18A by a non-illustrated attachment member.

The upper stay 36 includes an upper wall 36A provided to a vehicle upper side portion of the base member 34, a front section 36B, and a side wall 36C, and extends from the side wall 36C toward the vehicle rear direction and outer side. More specifically, the upper wall 36A configures a vehicle upper side portion of the upper stay 36 and has a plate shape with a plate thickness direction along the vehicle height direction.

The front section 36B configures a vehicle front side portion of the upper stay 36, has a plate shape having a plate thickness direction along the vehicle front-rear direction, and when in a state of contact with vehicle rear side of the front wall 34B is attached to the front wall 34B through plural attachment members.

The side wall 36C has a plate shape and extends from a vehicle width direction outer side peripheral edge of the front section 36B toward the vehicle rear direction and outer side. The portions of the upper stay 36 that configure the upper wall 36A and the side wall 36C have an L-shaped cross-section when viewed along the extension direction of these portions.

The lower stay 38 includes a lower wall 38A, a front wall 38B, and a side wall 38C, and is configured with vehicle height direction mirror symmetry to the upper stay 36. The lower stay 38 is, similarly to the upper stay 36, attached through attachment members to a vehicle lower side portion of the base member 34.

In the side radiator support section 32 configured as described above, the vehicle upper side portion of the side radiator 40 is attached to the upper stay 36 by a non-illustrated attachment member, and the vehicle lower side portion of the side radiator 40 is attached to the lower stay 38 by a non-illustrated attachment member. In other words, the upper stay 36 supports the vehicle upper side portion of the side radiator 40 with respect to the base member 34, and the lower stay 38 supports the vehicle lower side portion of the side radiator 40 with respect to the base member 34.

In the present exemplary embodiment the side radiator 40 and the side radiator 44 are supported by the side radiator support section 32 as described above, such that the side radiator 40 and the side radiator 44 are arranged at the vehicle width direction outer sides of the center radiator 28 in a state not overlapping with the center radiator 28 as viewed along the vehicle front-rear direction.

Returning to FIG. 8, the power unit mount 24 extends along the vehicle width direction, and connects the respective front frame sections 18A together in the vehicle width direction at a vehicle lower side of the suspension towers 26. A "power unit 48" driven by electrical power and configuring part of a travel control device 52 is attached to the power unit mount 24.

Moreover, a battery 50 is disposed between the main frame sections 18B of the frame 16, and electrical power is supplied from the battery 50 to the power unit 48. The power unit 48 and the battery 50 configure part of the travel control device 52 controlling travel of the vehicle 12.

Figure 6:
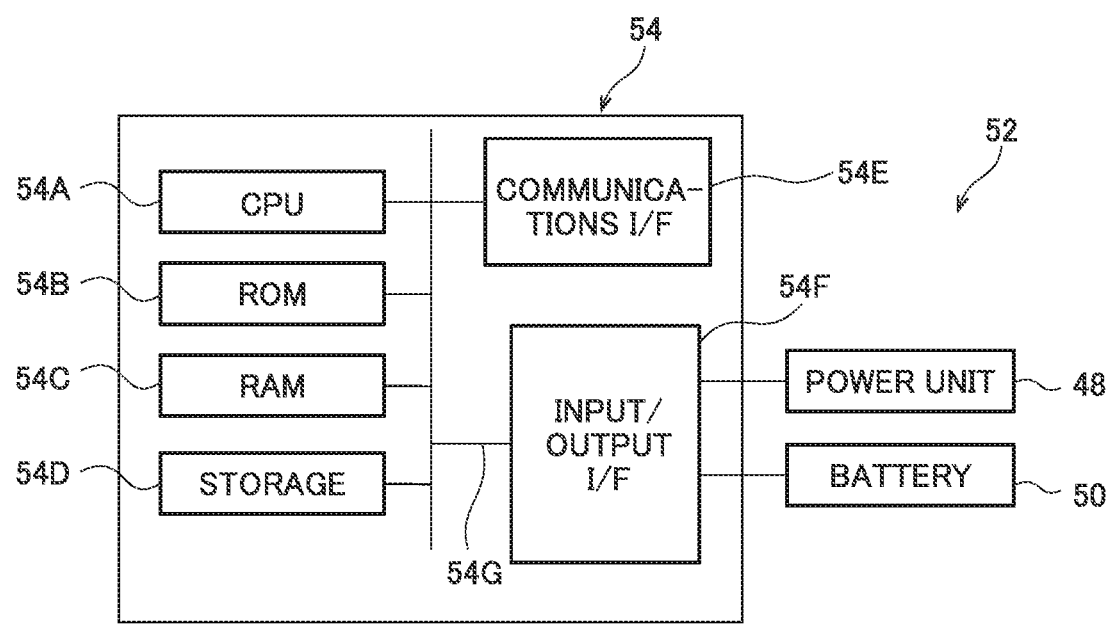
FIG. 6 is a block diagram illustrating a configuration of a main ECU installed at an electric vehicle according to an exemplary embodiment, and the periphery thereof.

More specifically, as illustrated in FIG. 6, the travel control device 52 includes the power unit 48 described above, the battery 50, and a main ECU 54 for controlling both of these. More precisely the main ECU 54 is configured including a central processing unit (CPU) 54A, read only memory (ROM) 54B, random access memory (RAM) 54C, storage 54D, a communications interface (I/F) 54E, and an input/output I/F 54F. The CPU 54A, the ROM 54B, the RAM 54C, the storage 54D, the communications I/F 54E, and the input/output I/F 54F are connected together through a bus 54G so as to be able to communicate with each other.

The CPU 54A is a central processing unit capable of controlling various equipment by executing various programs. Specifically, the CPU 54A reads a program from the ROM 54B and is able to execute the program using the RAM 54C as workspace. The main ECU 54 is able to exhibit various functions, described later, by the CPU 54A reading and executing an execution program stored in the ROM 54B.

More specifically, various programs and various data related to controlling the power unit 48 and the battery 50 etc. are stored in the ROM 54B. The RAM 54C is able to act as a workspace for temporarily storing programs and data.

The storage 54D is configured including a hard disk drive (HDD) or an solid state drive (SSD), and is able to store various programs including an operating system.

The communications I/F 54E is an interface employed to connect the main ECU 54 with various networks, and is able to communicate with an autonomous driving ECU 78 and the like, described later. This interface employs a communication standard such as Ethernet (registered trademark), FDDI, Wi-Fi (registered trademark), or the like. The communications I/F 54E may be equipped with a wireless device.

The input/output I/F 54F is an interface the main ECU 54 employs to communicate with various devices installed in the vehicle 12. The main ECU 54 is connected through the input/output I/F 54F to the power unit 48 and the battery 50 so as to enable communication therebetween.

Figure 5:
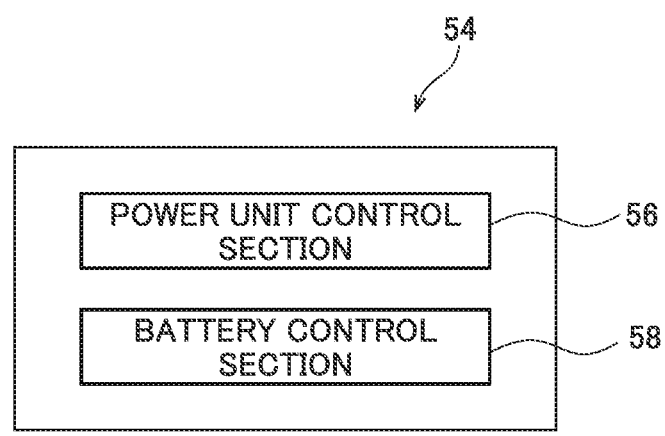
FIG. 5 is a block diagram illustrating a functional configuration of a main ECU installed at an electric vehicle according to an exemplary embodiment.

Next, description follows regarding a functional configuration of the main ECU 54, with reference to FIG. 5. In the main ECU 54, the CPU 54A reads an execution program stored in the ROM 54B, and by executing the program functions as an assembly configured by a power unit control section 56 and a battery control section 58.

More specifically, the power unit control section 56 controls the power unit 48 according to an operation signal based on operational input by a driver through a non-illustrated operation device and based on a control signal input from the autonomous driving ECU 78, described later.

A battery control section 58 controls the battery 50 under control of the power unit control section 56 such that required electrical power to drive the power unit 48 is supplied from the battery 50 to the power unit 48.

The vehicle body 14 has a substantially cuboid box shape configuration with an external shape extending along the vehicle front-rear direction, and configures the main portion of a vehicle cabin that is the occupation space of an occupant. The vehicle body 14 is configured so as to be basically symmetrical in both the vehicle front-rear direction and the vehicle width direction.

As illustrated in FIG. 1, the cooling system 10 according to the present exemplary embodiment is configured including a first cooling circuit 10A containing the side radiator 40 and a second cooling circuit 10B containing the side radiator 44. A feature of this configuration is that the first cooling circuit 10A or the second cooling circuit 10B is able to function alone in specific circumstances.

The first cooling circuit 10A is normally configured so as to be employed to cool the autonomous driving control device 76, and includes a three-way valve 60, a three-way valve 62, a "first outflow pipe 64", a "first inflow pipe 66", a device-side inflow pipe 68, and a device-side outflow pipe 70.

The three-way valve 60 includes a body 60A and a ball 60B. More specifically, the body 60A includes a first port 60A1, a second port 60A2, and a third port 60A3.

A connection state between the first port 60A1, the second port 60A2, and the third port 60A3 is switchable by the ball 60B housed inside the body 60A being driven by a non-illustrated actuator.

The three-way valve 62 is configured similarly to the three-way valve 60, and includes a body 62A including a first port 62A1, a second port 62A2, and a third port 62A3, and a ball 62B. The state of connection between the first port 62A1, the second port 62A2, and the third port 62A3 is switchable by the ball 62B being driven by a non-illustrated actuator.

One end of a first outflow pipe 64 is connected to a non-illustrated outflow port provided to the side radiator 40 for outflow of cooling water cooled in the side radiator 40, and the other end of the first outflow pipe 64 is connected to the first port 62A1 of the three-way valve 62.

One end of a first inflow pipe 66 is connected to a non-illustrated inflow port provided to the side radiator 40 for inflow of cooling water employed to cool the autonomous driving control device 76, and the other end of the first inflow pipe 66 is connected to the first port 60A1 of the three-way valve 60.

One end of a device-side inflow pipe 68 is connected to the third port 62A3 of the three-way valve 62, and the other end of the device-side inflow pipe 68 is connected to the autonomous driving control device 76.

One end of a device-side outflow pipe 70 is connected to a third port 60A3 of the three-way valve 60, and the other end of the device-side outflow pipe 70 is connected to the autonomous driving control device 76.

The second cooling circuit 10B, similarly to the first cooling circuit 10A, is normally employed to cool the autonomous driving control device 76, and includes the three-way valve 60, the three-way valve 62, the device-side inflow pipe 68, the device-side outflow pipe 70, a "second outflow pipe 72", and a "second inflow pipe 74".

One end of the second outflow pipe 72 is connected to a non-illustrated outflow port provided to the side radiator 44 for outflow of cooling water cooled by the side radiator 44, and the other end of the second outflow pipe 72 is connected the second port 62A2 of the three-way valve 62.

One end of the second inflow pipe 74 is connected to a non-illustrated inflow port provided to the side radiator 44 for inflow of cooling water employed to cool the autonomous driving control device 76, and the other end of the second inflow pipe 74 is connected to the second port 60A2 of the three-way valve 60.

Figure 2:
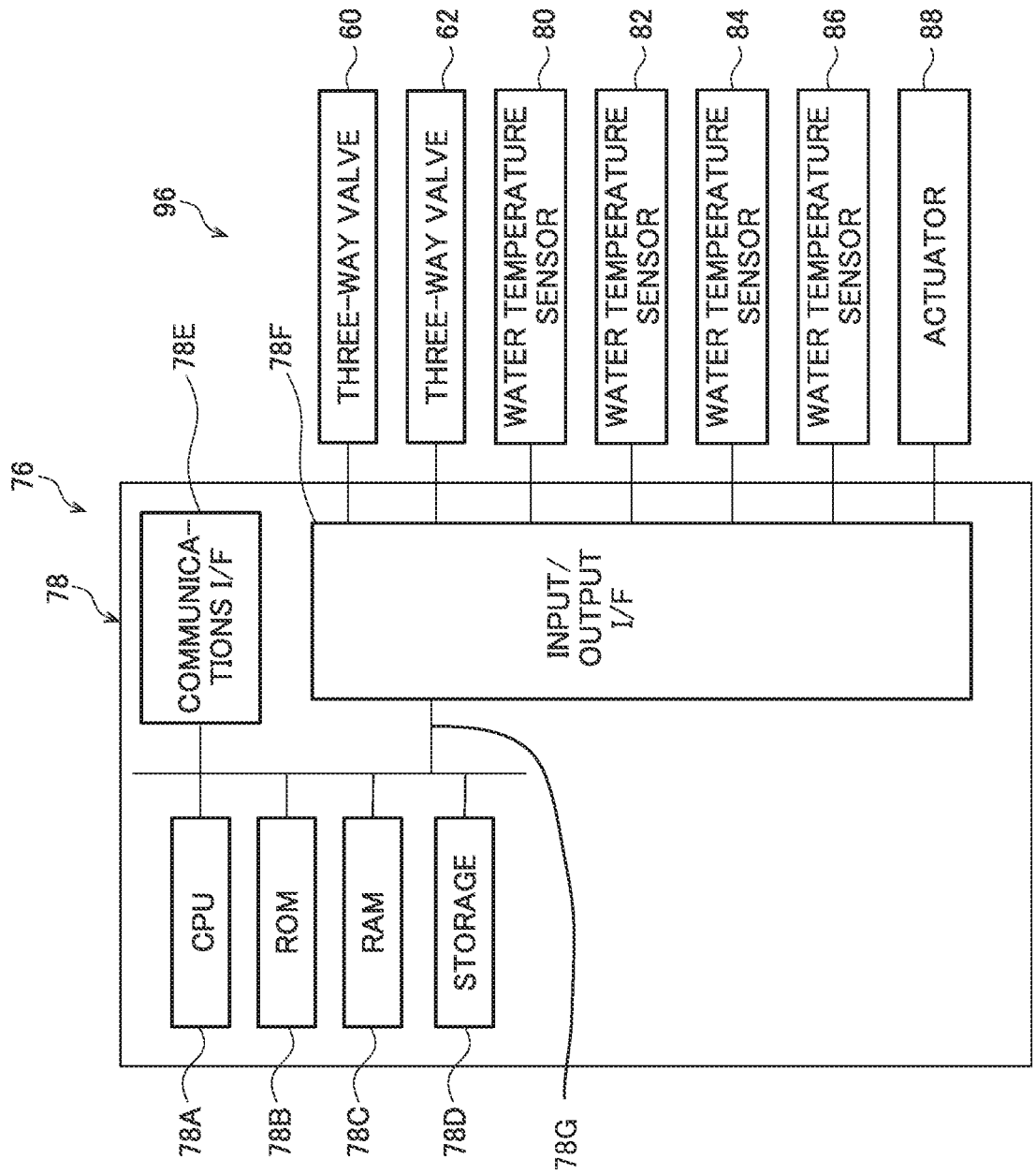
FIG. 2 is a block diagram illustrating a configuration of an autonomous driving ECU installed at an electric vehicle according to an exemplary embodiment, and the periphery thereof.

Explanation follows regarding configuration of the autonomous driving control device 76, with reference to FIG. 2. The autonomous driving control device 76 is configured including the autonomous driving ECU 78 and an autonomous driving actuator 88.

The autonomous driving ECU 78 is configured basically the same as the main ECU 54 described above, and is configured including a CPU 78A, ROM 78B, RAM 78C, storage 78D, a communications I/F 78E, an input/output I/F 78F, and a bus 78G. Note that a program related to autonomous driving of the vehicle 12 and a program related to control of the three-way valve 60 and the three-way valve 62 are stored in the ROM 78B. Various data needed for autonomous driving of the vehicle 12 are storable in the storage 78D.

The autonomous driving ECU 78 is connected through an input/output I/F 78F to the three-way valve 60, the three-way valve 62, a water temperature sensor 80, a water temperature sensor 82, a water temperature sensor 84, a water temperature sensor 86, and an autonomous driving actuator 88 so as to be able to communicate therewith.

More specifically a signal based on the temperature of cooling water flowing in the first outflow pipe 64, as illustrated in FIG. 1, is output to the autonomous driving ECU 78 by the water temperature sensor 80, a signal based on the temperature of cooling water flowing in the first inflow pipe 66 is output thereto by the water temperature sensor 82, a signal based on the temperature of cooling water flowing in the second inflow pipe 74 is output thereto by the water temperature sensor 84, and a signal based on the temperature of cooling water flowing in the second outflow pipe 72 is output thereto by the water temperature sensor 86.

Returning to FIG. 2, the autonomous driving actuator 88 is configured including a non-illustrated throttle actuator, brake actuator, and steering actuator. During autonomous driving of the vehicle 12, the autonomous driving actuator 88 is able to control a non-illustrated drive unit including an accelerator device, a braking device, and a steering device based on control signals output from the autonomous driving ECU 78.

Figure 3:
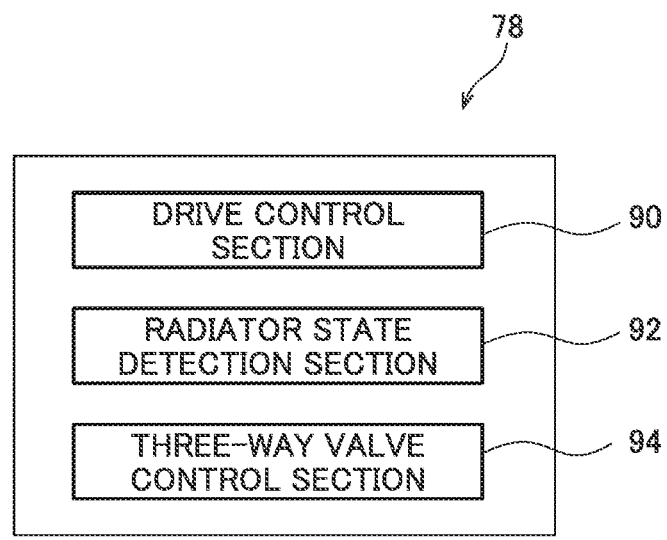
FIG. 3 is a block diagram illustrating a functional configuration of an autonomous driving ECU installed at an electric vehicle according to an exemplary embodiment.

Next explanation follows regarding a functional configuration of the autonomous driving ECU 78, with reference to FIG. 3. In the autonomous driving ECU 78, the CPU 78A reads an execution program stored in the ROM 78B, and by executing this program functions as an assembly configured by a drive control section 90, a radiator state detection section 92, and a three-way valve control section 94.

During autonomous driving of the vehicle 12, the drive control section 90 controls the autonomous driving actuator 88 based on a program stored in the ROM 78B and various data stored in the storage 78D, and drives the drive unit of the vehicle 12.

The radiator state detection section 92 compares a water temperature of cooling water as measured by the water temperature sensor 80 against a water temperature of cooling water as measured by the water temperature sensor 82, and from the difference between these water temperatures determines whether or not the side radiator 40 is operating correctly. In cases in which the side radiator 40 is determined as not operating correctly by the radiator state detection section 92, the radiator state detection section 92 is configured so as to output a first abnormal signal to the drive control section 90 and the three-way valve control section 94.

Moreover, the radiator state detection section 92 compares a water temperature of cooling water as measured by the water temperature sensor 84 against a water temperature of cooling water as measured by the water temperature sensor 86 and from the difference between these water temperatures determines whether or not the side radiator 44 is operating correctly. Then in cases in which the side radiator 44 is determined as not operating correctly by the radiator state detection section 92, the radiator state detection section 92 is configured so as to output a second abnormal signal to the drive control section 90 and the three-way valve control section 94.

The three-way valve control section 94 is able to change the cooling water flow path of the cooling system 10 by controlling an actuator for driving the ball 60B and an actuator for driving the ball 62B.

More specifically, in the present exemplary embodiment, in a normal state in which the side radiator 40 and the side radiator 44 are both functioning correctly, as illustrated in FIG. 1, the three-way valve control section 94 is configured so as to communicate the first port 60A1, the second port 60A2, and the third port 60A3 of the three-way valve 60 together with each other. Moreover, in this state the three-way valve control section 94 is configured so as to communicate the first port 62A1, the second port 62A2, and the third port 62A3 of the three-way valve 62 together with each other. In other words, the configuration in this state is such that the cooling water flowing in the autonomous driving control device 76 is cooled by both the side radiator 40 and the side radiator 44.

Figure 4:
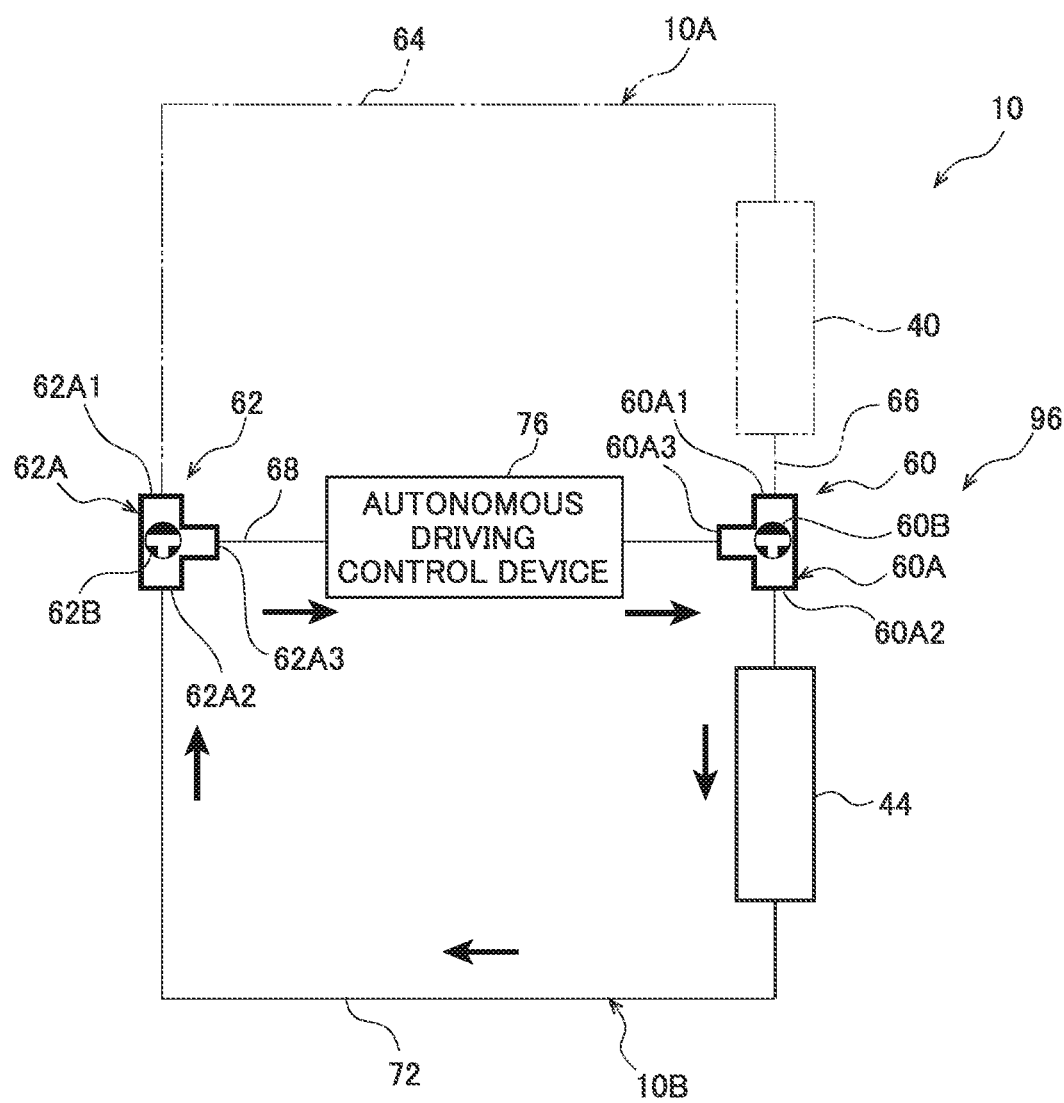
FIG. 4 is a circuit diagram schematically illustrating an abnormal state of an electric vehicle cooling system according to an exemplary embodiment.

However, in a first abnormal state in which the first abnormal signal is being output from the radiator state detection section 92 to the three-way valve control section 94, the three-way valve control section 94 is configured, as illustrated in FIG. 4, so as to communicate the second port 60A2 of the three-way valve 60 with the third port 60A3 thereof, and to communicate the second port 62A2 of the three-way valve 62 with the third port 62A3 thereof. Namely, in the first abnormal state, the cooling of the autonomous driving control device 76 is performed by the second cooling circuit 10B alone.

Moreover, in a second abnormal state in which the second abnormal signal is being output from the radiator state detection section 92 to the three-way valve control section 94, the three-way valve control section 94 communicates the first port 60A1 of the three-way valve 60 with the third port 60A3 thereof, and communicates the first port 62A2 of the three-way valve 62 with the third port 62A3 thereof. Namely, in the second abnormal state, the cooling of the autonomous driving control device 76 is performed by the first cooling circuit 10A alone.

Note that the drive control section 90 is configured to control the autonomous driving actuator 88 so as to evacuate the vehicle 12 to a safety zone when at least one out of the first abnormal signal or the second abnormal signal is input to the drive control section 90 from the radiator state detection section 92.

Moreover, in the three-way valve control section 94, in cases in which the water temperature of cooling water as measured by the water temperature sensor 82 and the water temperature sensor 84 has not reached a specific temperature, namely in cases in which the temperature of the autonomous driving control device 76 has not reached a specific temperature, the three-way valve 60 and the three-way valve 62 are controlled such that cooling of the autonomous driving control device 76 is performed by the first cooling circuit 10A alone or by the second cooling circuit 10B alone.

Namely, in the present exemplary embodiment, switching of the flow path of the cooling system 10 is performed by the three-way valve 60, the three-way valve 62, and the autonomous driving ECU 78, and hereafter the assembly thereof will be referred to as the "flow path switching section 96".

Operation and Effects of the Present Exemplary Embodiment

Explanation follows regarding the operation and effects of the present exemplary embodiment.

In the present exemplary embodiment, as illustrated in FIG. 8, the center radiator 28 is installed at the vehicle 12, and the power unit 48 of the vehicle 12 can be cooled by the center radiator 28 even in cases in which the power unit 48 is heated up by the power unit 48 being driven by electrical power.

Moreover, in the present exemplary embodiment, the side radiator 40 and the side radiator 44 are installed at the vehicle 12, enabling the autonomous driving control device 76 when heated up by operation to be cooled by both the side radiator 40 and the side radiator 44.

However, were the center radiator 28 and at least one out of the side radiator 40 or the side radiator 44 to be arranged so as to overlap when viewed along the vehicle front-rear direction, then hot airflow flowing from the center radiator 28 side would flow to the side of the side radiator 40 or the side of the side radiator 44, making it difficult to secure cooling efficiency thereof.

Thus the side radiator 40 and the side radiator 44 are arranged in the present exemplary embodiment at the vehicle width direction outer side of the center radiator 28, so as not to overlap with the center radiator 28 when viewed along the vehicle front-rear direction. This enables the hot airflow flowing from the center radiator 28 to be suppressed from flowing to the side of the side radiator 40 and the side of the side radiator 44. Thus in the present exemplary embodiment, effective cooling of the power unit 48 and the autonomous driving control device 76 can be secured in a vehicle 12 that is an electric vehicle capable of autonomous driving.

Moreover, the present exemplary embodiment enables the side radiator 40 or the side radiator 44 to be operated in cases in which the operating temperature of the autonomous driving control device 76 is low and the required heat dissipation amount is small, and enables both the side radiator 40 and the side radiator 44 to be operated in cases in which the operating temperature of the autonomous driving control device 76 is high and the required heat dissipation amount is large. Thus in the present exemplary embodiment, appropriate radiator cooling performance can be secured according to the operating temperature of the autonomous driving control device 76 and the required heat dissipation amount.

Moreover, in the present exemplary embodiment, as illustrated in FIG. 1, the first outflow pipe 64 and the first inflow pipe 66 are connected to the side radiator 40. The cooling water cooled by the side radiator 40 accordingly outflows through the first outflow pipe 64 to the autonomous driving control device 76 side and this cooling water is able to cool the autonomous driving control device 76. Moreover, the cooling water that has flowed from the autonomous driving control device 76 side through the first inflow pipe 66 inflows to the side radiator 40 and this cooling water is cooled by the side radiator 40.

Moreover, the second outflow pipe 72 and the second inflow pipe 74 are connected to the side radiator 44. The cooling water cooled by the side radiator 44 outflows to the autonomous driving control device 76 side through the second outflow pipe 72, enabling this cooling water to cool the autonomous driving control device 76. Moreover, the cooling water that has flowed from the autonomous driving control device 76 side through the second inflow pipe 74 inflows to the side radiator 44, and this cooling water is cooled by the side radiator 44.

However, were a malfunction to occur in the side radiator 40 or the side radiator 44 while the vehicle 12 is traveling, then this might conceivably lead to trouble with autonomous driving of the vehicle 12. In such circumstances, while the vehicle 12 is evacuating to a safety zone the autonomous driving control device 76 can be cooled by the non-malfunctioning radiator alone from out of the side radiator 40 and the side radiator 44.

Thus the flow path switching section 96 is included in the present exemplary embodiment, enabling the cooling water flow path to be changed according to the state of the side radiator 40 and the side radiator 44.

More specifically in the flow path switching section 96, in a state in which a first heat exchange is permitted between the side radiator 40 and the autonomous driving control device 76, and a second heat exchange is permitted between the side radiator 44 and the autonomous driving control device 76, a first connection is permitted between the first outflow pipe 64 and the second outflow pipe 72, and a second connection is permitted between the first inflow pipe 66 and the second inflow pipe 74.

Namely, in the present exemplary embodiment, in a state in which the side radiator 40 and the side radiator 44 are both running correctly, the cooling water respectively outflowing from the first outflow pipe 64 and from the second outflow pipe 72 merges together, so as to flow into the autonomous driving control device 76 side. Moreover, the cooling water that has outflowed from the autonomous driving control device 76 side flows out so as to split and flow respectively to the side of the side radiator 40 and to the side of the side radiator 44.

Moreover, in a state in which one of the first heat exchange or the second heat exchange is prevented, the flow path switching section 96 prevents the first connection and the second connection and prevents the inflow and outflow of cooling water to and from the side of the side radiator 40 or the side radiator 44 configuring the prevented heat exchange.

Namely, in the present exemplary embodiment, in the first abnormal state in which the side radiator 40 is not functioning, or in the second abnormal state in which the side radiator 44 is not functioning, the non-functioning radiator from out of the side radiator 40 or the side radiator 44 is isolated from the flow path of the cooling water flow path. This enables a state to be achieved in which a certain degree of cooling performance is secured for the autonomous driving control device 76 by using the functioning radiator from out of the side radiator 40 or the side radiator 44. This means that a state can be achieved in which a certain degree of traveling performance of the vehicle 12 is secured even in an abnormal state in the present exemplary embodiment in which sufficient cooling performance is unable to be secured for the autonomous driving control device 76.

Moreover, in the present exemplary embodiment, as illustrated in FIG. 7, the base member 34 extending in the vehicle height direction is supported by the vehicle width direction outer side portions of the frame 16 of the vehicle 12. The upper stays 36 respectively extend from the vehicle upper side portion of the base member 34 toward the vehicle rear and outer side, and the vehicle upper side portions of the side radiator 40 and the side radiator 44 are respectively supported by the upper stays 36.

The lower stays 38 respectively extend from the vehicle lower side portion of the base member 34 toward the vehicle rear and outer side, and the vehicle lower side portions of the side radiator 40 and the side radiator 44 are respectively supported by the lower stays 38.

Thus in the present exemplary embodiment, as illustrated in FIG. 8, the side radiator 40 and the side radiator 44 can be arranged in an angled state with respect to the vehicle front-rear direction as viewed along the vehicle height direction. As a result thereof the present exemplary embodiment enables the side radiator 40 and the side radiator 44 to be arranged so as to follow a styling face of the vehicle 12.

Supplementary Explanation to Above Exemplary Embodiment (1) Although in the exemplary embodiment described above plural three-way valves are employed to switch the flow path of the cooling system 10, there is no limitation thereto. For example, depending on the specification and the like of the cooling system 10, the first outflow pipe 64, the first inflow pipe 66, the device-side inflow pipe 68, the device-side outflow pipe 70, the second outflow pipe 72, and the second inflow pipe 74 may be connected to solenoid valves equipped with plural ports, in a configuration such that the flow path of the cooling system 10 is switched by controlling the solenoid valves with the autonomous driving ECU 78.

(2) Moreover, although in the exemplary embodiment described above the cooling system 10 according to the present exemplary embodiment is installed at a vehicle front side section of the vehicle 12, there is no limitation thereto. Namely, depending on the specification and the like of the vehicle 12, the cooling system 10 may be installed at a vehicle rear side section of the vehicle 12.

(3) Furthermore, although in the exemplary embodiment described above a configuration is adopted in which plural members are employed as the side radiator support section 32, there is no limitation thereto. Namely, depending on the specification and the like of the vehicle 12, the side radiator support section 32 may be configured by a single component.

What is claimed is:

1. An electric vehicle cooling system, comprising:
a first radiator installed at a vehicle and configured to cool a power unit driven by electrical power;
second radiator installed at the vehicle, disposed at least at one side in a vehicle width direction, or another side in the vehicle width direction, of the first radiator so as not to overlap with the first radiator as viewed along a vehicle front-rear direction, and configured to cool an autonomous driving control device configured to control autonomous driving of the vehicle; and
a support section extending in a vehicle height direction and supported by an outer side portion, in a vehicle width direction, of a frame of the vehicle;
an upper extension portion extending from a vehicle upper side portion of the support section toward a vehicle front-rear direction center and a vehicle width direction outer side, and supporting a vehicle upper side portion of the second radiator; and
a lower extension portion extending from a vehicle lower side portion of the support section toward the vehicle front-rear direction center and the vehicle width direction outer side, and supporting a vehicle lower side portion of the second radiator.

2. The electric vehicle cooling system of claim 1, wherein the second radiator comprises a pair of the second radiators disposed at an interval from each other in the vehicle width direction.

3. The electric vehicle cooling system of claim 2, further comprising:
a first outflow pipe configured to allow cooling water cooled by one of the pair of second radiators to flow out to a side of the autonomous driving control device, and a first inflow pipe configured to allow the cooling water, which has flowed from the side of the autonomous driving control device, to flow into the one of the pair of second radiators, both of the first outflow pipe and the first inflow pipe being connected to the one of the pair of second radiators;
a second outflow pipe configured to allow the cooling water cooled by the other of the pair of second radiators to flow out to the side of the autonomous driving control device, and a second inflow pipe configured to allow the cooling water, which has flowed from the side of the autonomous driving control device, to flow into the other of the pair of second radiators, both of the second outflow pipe and the second inflow pipe being connected to the other of the pair of second radiators; and
a flow path switching section that, in a state in which a first heat exchange is permitted between the one of the pair of second radiators and the autonomous driving control device and a second heat exchange is permitted between the other of the pair of second radiators and the autonomous driving control device, is configured to permit a first connection between the first outflow pipe and the second outflow pipe and to permit a second connection between the first inflow pipe and the second inflow pipe, and in a state in which one of the first heat exchange or the second heat exchange is prevented, the flow path switching section is configured to prevent the first connection and the second connection and to prevent inflow and outflow of the cooling water to and from a side of the second radiator configuring the prevented heat exchange.

4. An electric vehicle cooling system, comprising:
a first radiator installed at a vehicle and configured to cool a power unit driven by electrical power;
a pair of second radiators installed at the vehicle, disposed at an interval from each other in a vehicle width direction so as not to overlap with the first radiator as viewed along a vehicle front-rear direction, and configured to cool an autonomous driving control device configured to control autonomous driving of the vehicle;
a first outflow pipe configured to allow cooling water cooled by one of the pair of second radiators to flow out to a side of the autonomous driving control device, and a first inflow pipe configured to allow the cooling water, which has flowed from the side of the autonomous driving control device, to flow into the one of the pair of second radiators, both of the first outflow pipe and the first inflow pipe being connected to the one of the pair of second radiators;
a second outflow pipe configured to allow the cooling water cooled by the other of the pair of second radiators to flow out to the side of the autonomous driving control device, and a second inflow pipe configured to allow the cooling water, which has flowed from the side of the autonomous driving control device, to flow into the other of the pair of second radiators, both of the second outflow pipe and the second inflow pipe being connected to the other of the pair of second radiators; and
a flow path switching section that, in a state in which a first heat exchange is permitted between the one of the pair of second radiators and the autonomous driving control device and a second heat exchange is permitted between the other of the pair of second radiators and the autonomous driving control device, is configured to permit a first connection between the first outflow pipe and the second outflow pipe and to permit a second connection between the first inflow pipe and the second inflow pipe, and in a state in which one of the first heat exchange or the second heat exchange is prevented, the flow path switching section is configured to prevent the first connection and the second connection and to prevent inflow and outflow of the cooling water to and from a side of the second radiator configuring the prevented heat exchange.

\* \* \* \* \*